US012637031B2

(12) United States Patent
Shimizu et al.

(10) Patent No.: US 12,637,031 B2
(45) Date of Patent: May 26, 2026

(54) VEHICLE

(71) Applicant: TOYOTA JIDOSHA KABUSHIKI KAISHA, Toyota (JP)

(72) Inventors: Tatsuya Shimizu, Okazaki (JP); Katsuya Shimazu, Toyota (JP); Ayaka Kagami, Inazawa (JP); Mutsumi Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 289 days.

(21) Appl. No.: 18/382,682

(22) Filed: Oct. 23, 2023

(65) Prior Publication Data

US 2024/0182000 A1 Jun. 6, 2024

(30) Foreign Application Priority Data

Dec. 5, 2022 (JP) ................................. 2022-194396

(51) Int. Cl.
*B60S 1/66* (2006.01)
*B60K 1/04* (2019.01)
*B60L 53/80* (2019.01)

(52) U.S. Cl.
CPC ......... *B60S 1/66* (2013.01); *B60K 2001/0438* (2013.01); *B60K 2001/0472* (2013.01); *B60L 53/80* (2019.02)

(58) Field of Classification Search
CPC .............. B60S 1/62; B60S 1/66; B60L 53/80; B60K 2001/0438; B60K 2001/0472
See application file for complete search history.

(56) References Cited

U.S. PATENT DOCUMENTS

| | | | |
|---|---|---|---|
| 2015/0078940 A1 | 3/2015 | Kikuta et al. | |
| 2018/0186243 A1 | 7/2018 | Qi et al. | |
| 2021/0098761 A1* | 4/2021 | Montgomery ...... | H01M 50/249 |

FOREIGN PATENT DOCUMENTS

| | | | | | |
|---|---|---|---|---|---|
| CN | 106347317 A | * | 1/2017 | ............... | B60S 1/66 |
| CN | 106627235 A | | 5/2017 | | |
| CN | 107054303 A | | 8/2017 | | |
| CN | 207032134 U | * | 2/2018 | | |
| CN | 208277831 U | | 12/2018 | | |
| CN | 111889403 A | | 11/2020 | | |
| JP | 2006-256364 A | | 9/2006 | | |
| JP | 2011-148382 A | | 8/2011 | | |
| JP | 2013-121209 A | | 6/2013 | | |
| JP | 2015-083830 A | | 4/2015 | | |
| KR | 20090023813 A | * | 3/2009 | ............... | B60S 1/66 |
| WO | 2018/126660 A1 | | 7/2018 | | |

* cited by examiner

*Primary Examiner* — James J Taylor, II
(74) *Attorney, Agent, or Firm* — Sughrue Mion, PLLC

(57) ABSTRACT

A vehicle that is an electric vehicle, includes a battery, a vehicle body, a fastening member, and a cleansing unit. The vehicle body includes a mounting portion. The mounting portion is configured to mount the battery. The fastening member fastens the battery to the mounting portion. The cleansing unit cleanses the fastening member.

4 Claims, 6 Drawing Sheets

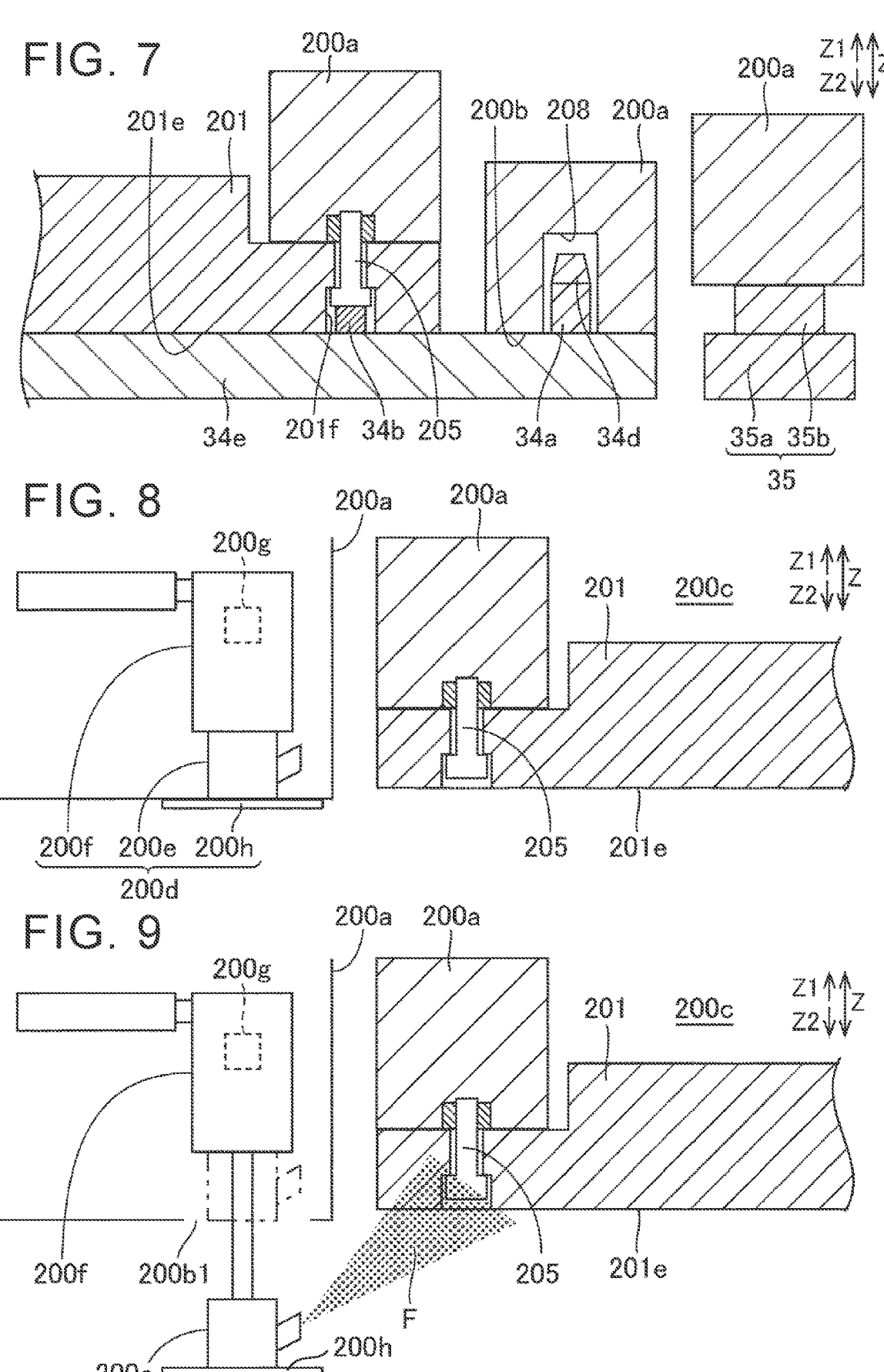

VEHICLE

CROSS-REFERENCE TO RELATED APPLICATION

This application claims priority to Japanese Patent Application No. 2022-194396 filed on Dec. 5, 2022, incorporated herein by reference in its entirety.

BACKGROUND

1. Technical Field

The present disclosure relates to a vehicle.

2. Description of Related Art

CN 106627235 A, for example, discloses fastening a battery to a vehicle body by inserting bolts into insertion holes.

SUMMARY

In the battery electric vehicle disclosed in CN 106627235 A, when there is adhesion of foreign matter to a fastening portion, a tool for rotating the bolt may not fit to the bolt, resulting in inability to remove battery from the vehicle body.

An object of the present disclosure is to provide a vehicle in which a tool can be fit to a fastening member.

A vehicle according to one aspect of the present disclosure includes a vehicle body including a mounting portion that is configured to mount a battery, the battery disposed in the mounting portion, a fastening member for fastening the battery to the mounting portion, and a cleansing unit for cleansing the fastening member.

According to the present disclosure, a vehicle in which a tool can be fit to a fastening member can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram schematically illustrating a state in which the battery placement table and the electrified vehicle are positioned relative to each other:

FIG. 8 is a diagram schematically illustrating a configuration of a cleansing unit:

FIG. 9 is a diagram schematically illustrating the configuration of the cleansing unit:

DETAILED DESCRIPTION OF EMBODIMENTS

An embodiment of the present disclosure will be described below in detail with reference to the drawings. The same or corresponding parts are denoted by the same signs throughout the drawings, and description thereof will not be repeated.

Figure 1:
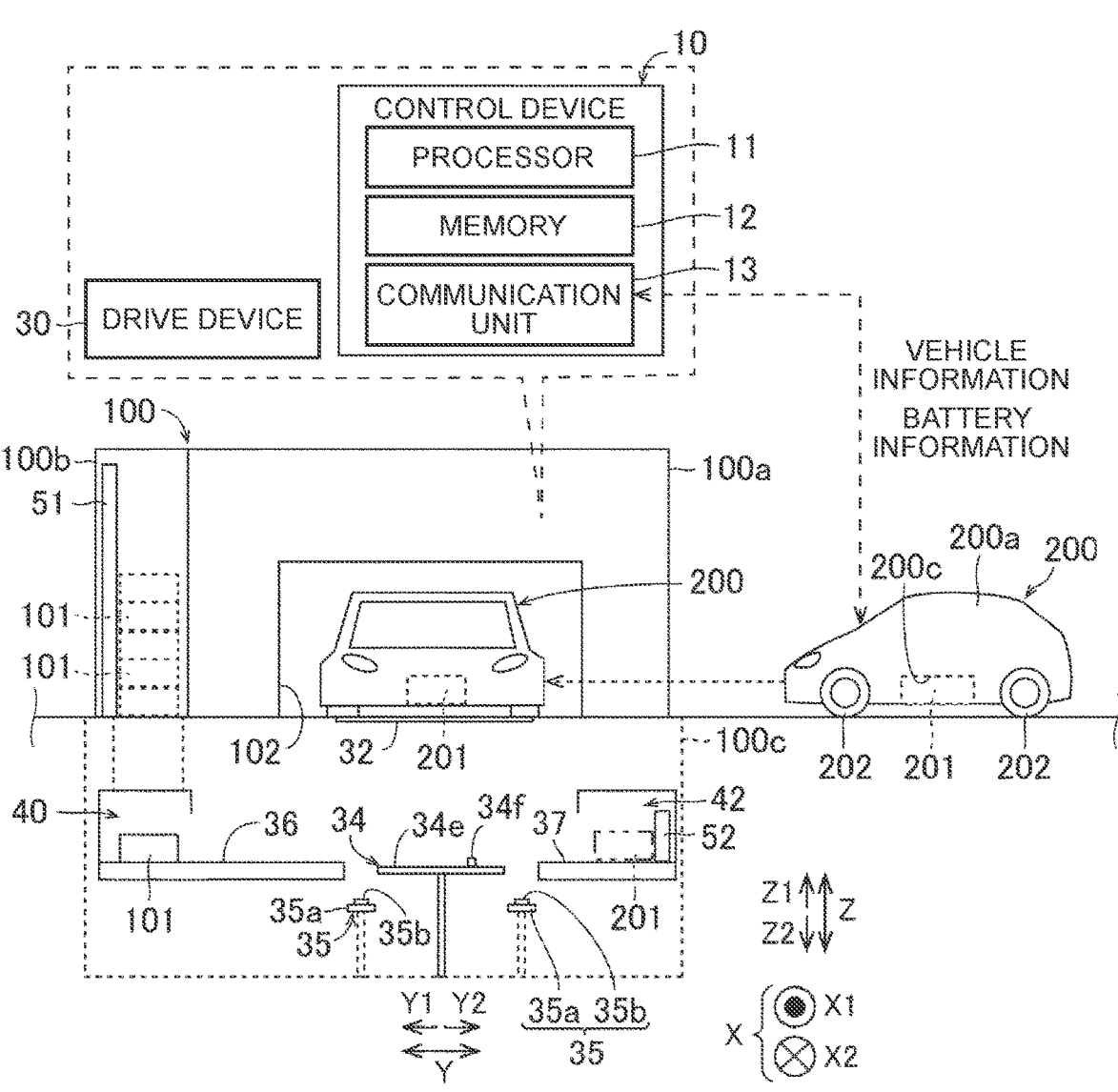
FIG. 1 is a diagram schematically illustrating a battery replacing device according to an embodiment of the present disclosure.

FIG. 1 is a diagram illustrating a battery replacing device 100 and an electrified vehicle 200 according to the present embodiment. The battery replacing device 100 is a device for replacing a battery (used battery) 201 attached to the electrified vehicle 200 with a battery (new battery) 101 that is charged. The battery 201 and the battery 101 are examples of a "first battery" and a "second battery" of the present disclosure, respectively.

Configuration of Electrified Vehicle

Figures 2, 3:
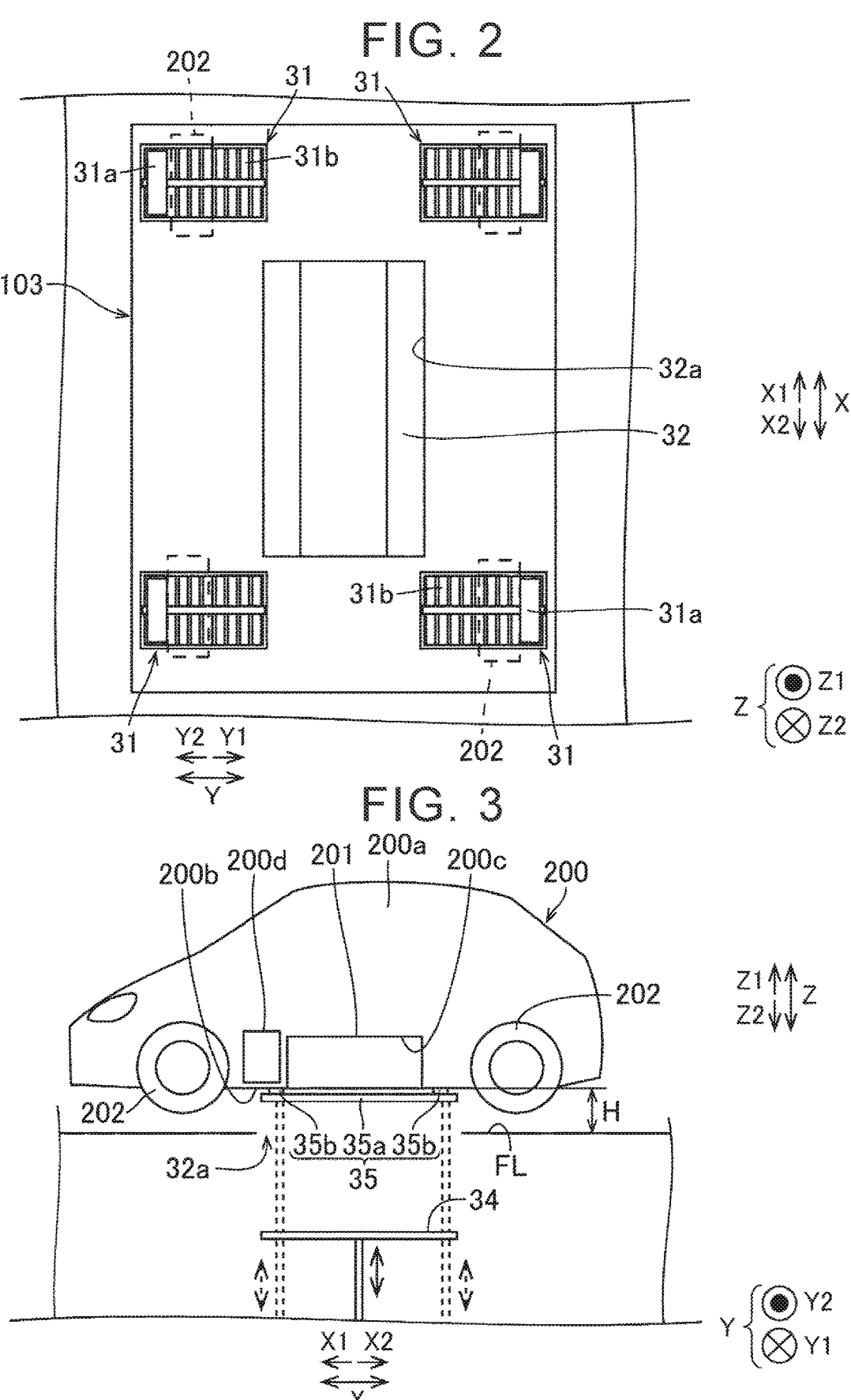
FIG. 2 is a plan view illustrating a vehicle stop area in the battery replacing device.
FIG. 3 is a diagram schematically illustrating a configuration of a battery placement table and a lift unit.

As illustrated in FIG. 3, the electrified vehicle 200 has a vehicle body 200a and a cleansing unit 200d.

The vehicle body 200a has a mounting portion 200c in which the batteries 101, 201 can be mounted. As illustrated in FIG. 3, the mounting portion 200c has a shape that is recessed upward from a lower face 200b of the vehicle body 200a. The batteries 101 and 201 are fastened to the mounting portion 200c by fastening members 205 (see FIGS. 7 and 8) such as bolts or the like.

The cleansing unit 200d cleanses the fastening members 205. As illustrated in FIGS. 8 and 9, the cleansing unit 200d has a spray unit 200e, a supply unit 200f, and a cover 200h.

As illustrated in FIG. 9, the spray unit 200e sprays a cleansing fluid (air, cleansing liquid, or the like) F that is capable of cleansing the fastening member 205, toward fastening member 205. The spray unit 200e is movable in an up-down direction between a spraying position (position illustrated in FIG. 9) and a stored position (position illustrated in FIG. 8). The spraying position is a position where the cleansing fluid F can be sprayed toward the fastening member 205 from below. The stored position is a position where the spray unit 200e is stowed inside the vehicle body 200a. As illustrated in FIG. 9, the lower face 200b of the vehicle body 200a is provided with an opening 200b1 that enables the spray unit 200e to pass therethrough.

The supply unit 200f supplies the cleansing fluid to the spray unit 200e. The supply unit 200f includes a pump 200g that feeds the cleansing fluid towards the spray unit 200e. The spray unit 200e moves from the stored position to the spraying position, under pressure of the cleansing fluid that is generated by driving the pump 200g. Note that when the pump 200g is stopped, the spray unit 200e returns from the spraying position to the stored position under a biasing force of a biasing member (omitted from illustration) that is provided in the supply unit 200f.

The cover 200h has a shape that closes the opening 200b1 formed in the lower face 200b of the vehicle body 200a. The cover 200h is fixed to a lower face of the spray unit 200e. The cover 200h closes the opening 200b1 when the spray unit 200e is located at the stored position.

Configuration of Battery Replacing Device

The battery replacing device 100 includes a battery replacing station 100a, a storage compartment 100b, and an underfloor area 100c.

The battery replacing station 100a is a station where removal of the battery 201 from the electrified vehicle 200 and attachment of the battery 101 to the electrified vehicle 200 are performed. The battery replacing station 100a is provided with an entrance 102 from which the electrified vehicle 200 enters and exits.

The storage compartment 100b stores batteries 101 that are charged. The storage compartment 100b is built annexed to the battery replacing station 100a. A charging facility 51 capable of charging the battery 201 removed from the electrified vehicle 200 is provided in the storage compartment 100b. The battery 201 is charged by the charging facility 51 in the storage compartment 100b. The battery 101 charged in the storage compartment 100b, i.e., the battery 101 that is charged is transported to the electrified vehicle 200 after being moved to a temporary storage site 40 provided in the underfloor area 100c.

The underfloor area 100c is provided below the battery replacing station 100a and the storage compartment 100b. The underfloor area 100c is provided with a battery placement table 34, a lift unit 35, a first transporting unit 36, and a second transporting unit 37, which will be described later.

The battery replacing device 100 includes a control device 10 and a drive device 30.

The control device 10 includes a processor 11, memory 12, and a communication unit 13. The memory 12 stores programs to be executed by the processor 11, as well as information used by the programs (e.g., maps, mathematical expressions, and various types of parameters). The processor 11 controls the drive device 30, which will be described in detail later.

The communication unit 13 includes various types of communication interfaces. The processor 11 controls the communication unit 13. The communication unit 13 communicates with a data communication module (DCM) and so forth of the electrified vehicle 200. Bi-directional communication can be performed between the communication unit 13 and the electrified vehicle 200. Note that the communication unit 13 may communicate with a mobile terminal or the like owned by a user of the electrified vehicle 200.

As illustrated in FIG. 2, the battery replacing device 100 is provided with a vehicle stop area 103. When the user performs an operation to instruct starting of battery replacement work at a navigation system (omitted from illustration) of the electrified vehicle 200 in a state in which the electrified vehicle 200 is stopped in the vehicle stop area 103, the communication unit 13 receives an instruction signal to start the battery replacement work from the electrified vehicle 200. The processor 11 starts controlling the battery replacement work based on reception of the instruction signal by the communication unit 13. Note that the electrified vehicle 200 stops in the vehicle stop area 103 such that a front-rear direction matches an X direction and a right-left direction matches a Y direction.

The drive device 30 includes wheel securing units 31 (see FIG. 2), a shutter 32 (see FIG. 2), the battery placement table 34 (see FIG. 1), the lift unit 35 (see FIG. 1), the first transporting unit 36 (See FIG. 1), and the second transporting unit 37 (See FIG. 1).

Referring to FIG. 2 again, four of the wheel securing units 31 are provided in the vehicle stop area 103. The wheel securing units 31 are provided so as to correspond to each of four wheels 202 of electrified vehicle 200.

Each of the wheel securing units 31 includes a pressing member 31a and a lateral roller portion 31b. The pressing members 31a move the wheels 202 by pressing the wheels 202 from the outer side thereof (sideward). The pressing members 31a are disposed straddling the lateral roller portions 31b. Thus, the wheels 202 are positioned by the wheel securing units 31.

The lateral roller portions 31b are made up of a plurality of rollers of which the rotation axes extend in the X direction. The rollers of the lateral roller portions 31b are arrayed in the Y direction. Rotating the rollers of the lateral roller portions 31b moves the pressing members 31a in the Y direction.

As illustrated in FIG. 2, the shutter 32 is provided in the vehicle stop area 103. The shutter 32 is configured to be capable of opening and closing an opening portion 32a formed in a floor surface FL of the vehicle stop area 103. The shutter 32 can be switched between an open state in which the opening portion 32a is open and a closed state in which the opening portion 32a is closed.

The lift unit 35 can move in the up-down direction through the opening portion 32a, between a position higher than the floor surface FL and a position lower than the floor surface FL. As illustrated in FIG. 3, the lift unit 35 can rise to a position where the wheels 202 of the electrified vehicle 200 are lifted off of the floor surface FL, in a state of holding the electrified vehicle 200 from below. The lift unit 35 raises the electrified vehicle so that a height H of the lower face 200b of the vehicle body 200a from the floor surface FL reaches a predetermined height.

The lift unit 35 includes a pair of lifting bars 35a that are disposed spaced apart in a direction (Y direction) orthogonal to the up-down direction. Each of the lifting bars 35a is provided with two projecting portions 35b projecting upward. The electrified vehicle 200 is supported from below by two projecting portions 35b of each of the lifting bars 35a, (i.e., four projecting portions 35b).

Figure 4:
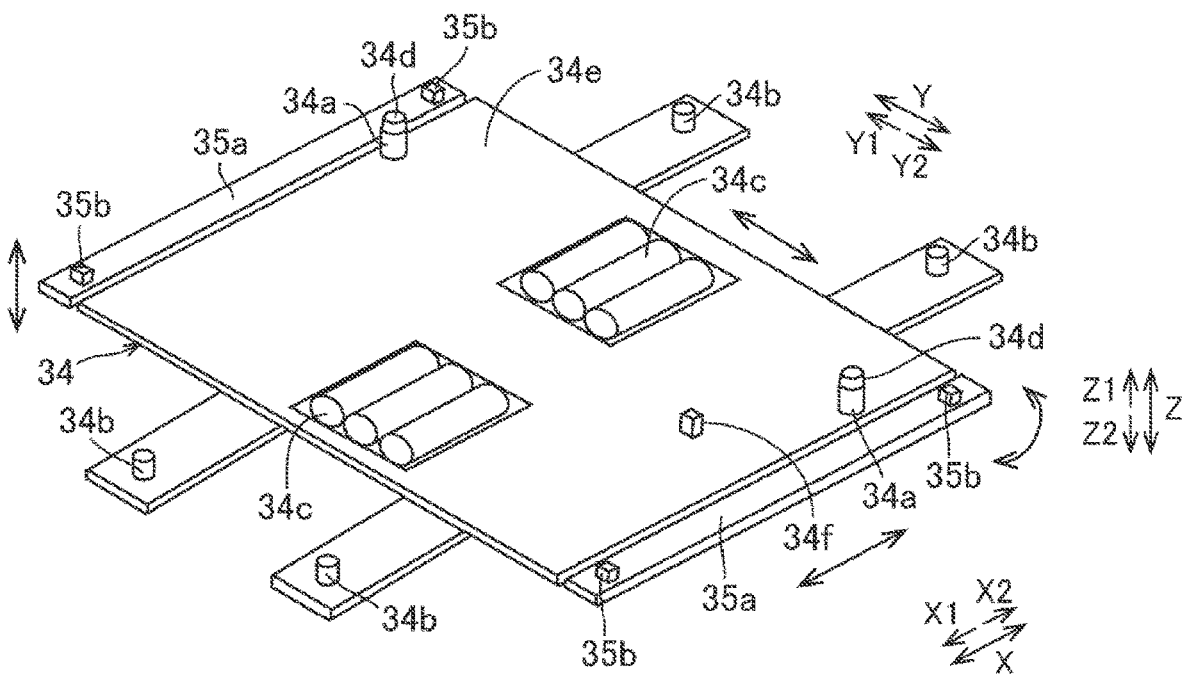
FIG. 4 is a perspective view schematically illustrating the configuration of the battery placement table and the lift unit.

The battery placement table 34 is disposed below the battery replacing station 100a, more specifically below the opening portion 32a. The battery placement table 34 is capable of having the batteries 101 and 201 placed thereon and is movable in the up-down direction. As illustrated in FIG. 4, the battery placement table 34 has a base portion 34e, two positioning pins 34a, four locking/unlocking tools 34b, roller portions 34c, and a stopper 34f.

The base portion 34e is disposed between the lifting bars 35a. The base portion 34e is movable in the up-down direction. The base portion 34e is formed having a form of a flat plate. The base portion 34e has an outer shape that is larger than the outer shape of the batteries 101 and 201. The base portion 34e is configured to be movable in a lateral direction below the electrified vehicle 200. Specifically, the base portion 34e is movable in the X direction (X1 direction, X2 direction) and the Y direction (Y1 direction, Y2 direction). The base portion 34e is rotatable so as to change the orientation (angle) thereof in the XY plane. Note that each of the lifting bars 35a may also be movable in the same manner as the base portion 34e.

Each positioning pin 34a is provided on the base portion 34e. Each positioning pin 34a is a part for performing positioning of the vehicle body 200a of the electrified vehicle 200 and the base portion 34e. One positioning pin 34a is provided at one end portion of the base portion 34e in a direction parallel to a vehicle width direction (Y direction). The other positioning pin 34a is provided at the other end portion of the base portion 34e in the direction parallel to the vehicle width direction (Y direction).

Figure 5:
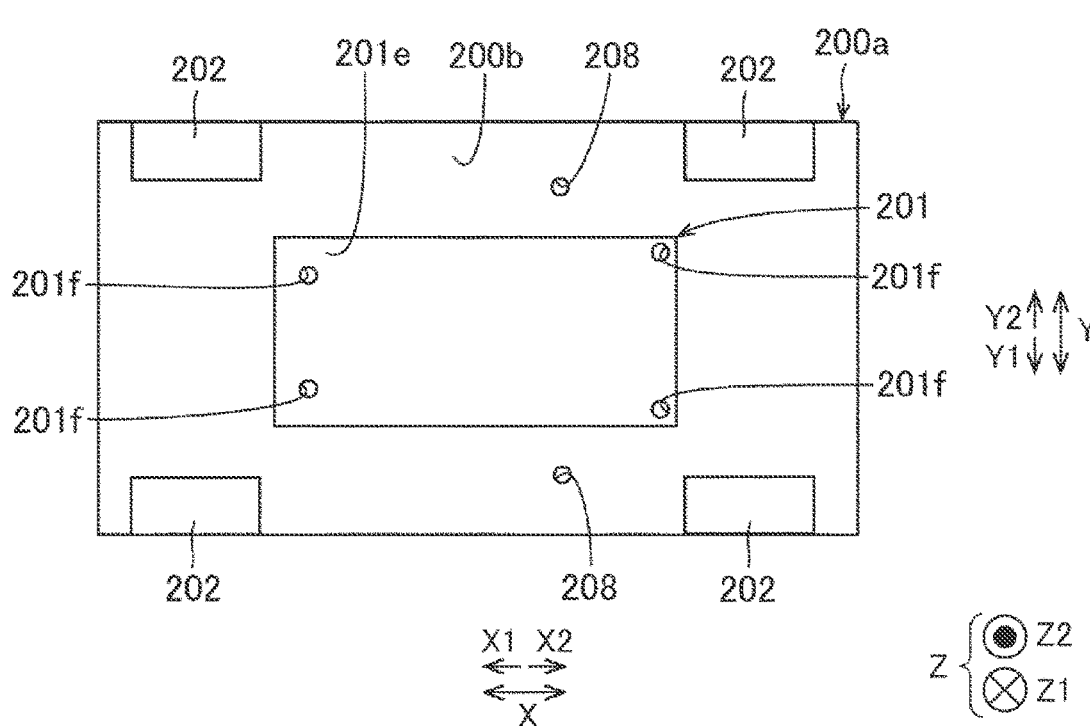
FIG. 5 is a bottom view of an electrified vehicle.

As illustrated in FIG. 5, the lower face 200b of the vehicle body 200a of the electrified vehicle 200 is provided with pin insertion holes 208 into which the positioning pins 34a are inserted. Each positioning pin 34a is insertable into a corresponding one of the pin insertion holes 208.

Each locking/unlocking tool 34b is movable in the up-down direction. Each locking/unlocking tool 34b is movable in the up-down direction with respect to the base portion 34e. As illustrated in FIG. 4, each locking/unlocking tool 34b is disposed on an inward side of the positioning pins 34a in the Y direction. Each locking/unlocking tool 34b is disposed on an outer side of the base portion 34e in the X direction.

As illustrated in FIG. 5, the battery 201 has a bottom face 201e, and the bottom face 201e is provided with tool insertion holes 201f into which the locking/unlocking tools 34b are inserted. Tool insertion holes are also provided on a bottom face of the battery 101. Each locking/unlocking tool 34b can be inserted into a corresponding one of the tool insertion holes.

The roller portions 34c are provided in the base portion 34e. The roller portions 34c are rotatable about rotation axes extending in the X direction. Rotating the roller portions 34c in one direction moves the batteries 101 and 201 relative to the base portion 34e to one side in the Y direction (e.g., to the Y1 side), and rotating the roller portions 34c in the other direction moves the batteries 101 and 201 relative to the base portion 34e to the other side in the Y direction.

A marker 34d is provided at a distal end portion of each positioning pin 34a. The marker 34d is made up of a light emitter such as a light-emitting diode (LED) or the like. The marker 34d may have an upwardly tapered form.

The stopper 34f is provided on the base portion 34e. The stopper 34f will be described later.

Now, referring to FIG. 1 again, the first transporting unit 36 transports the battery 101 stored in the storage compartment 100b toward the battery placement table 34. Specifically, the underfloor area 100c is provided with the temporary storage site 40 for temporarily storing the charged battery 101 that was stored in the storage compartment 100b, and the first transporting unit 36 can transport the battery 101 from the temporary storage site 40 toward the battery placement table 34. Note that the first transporting unit 36 may be of a conveyor belt type, for example.

The second transporting unit 37 transports the used battery 201, which is removed from the electrified vehicle 200 and placed on the battery placement table 34, away from the battery placement table 34. Specifically, in the underfloor area 100c, a storage space 42 for storing the battery 201 is provided at a position spaced apart from the storage compartment 100b, and the second transporting unit 37 transports the battery 201 from the battery placement table 34 toward the storage space 42, in the transporting direction in which the first transporting unit 36 transports the battery 101 toward the battery placement table 34 (Y2 direction). The first transporting unit 36 and the second transporting unit 37 are disposed so as to be arrayed on the same straight line. Note that the second transporting unit 37 may also be of a conveyor belt type, for example.

A charging facility 52 capable of charging the battery 201 is provided in the storage space 42. The battery 201 stored in the storage space 42 is transported to the storage compartment 100b by a transport unit (omitted from illustration) after charging by the charging facility 52 is completed, or during charging thereof. Note that the transport unit may be made up of the first transporting unit 36 and the second transporting unit 37.

Now, description of the stopper 34f will be given. The stopper 34f is provided at a portion of the base portion 34e that is on a downstream side from the roller portions 34c in the transporting direction (Y2 direction). The stopper 34f abuts the battery 101, which is transported from the first transporting unit 36 to the base portion 34e, from a direction opposite to the transporting direction. The position of the stopper 34f in a direction parallel to the transporting direction (Y direction) is set in accordance with the position of the battery 201 to be mounted in electrified vehicle 200. The stopper 34f is movable in the up-down direction between a projecting position (position illustrated in FIG. 4) projecting upward from the base portion 34e so as to abut the batteries 101 and 201, and a sunken position of being sunken into the base portion 34e, so as to enable movement of the used battery 201 from the base portion 34e to the second transporting unit 37.

Movement of the stopper 34f between the projecting position and the sunken position is controlled by the processor 11 of the control device 10. The processor 11 positions the stopper 34f at the projecting position when the charged battery 101 moves from the first transporting unit 36 to the base portion 34e, and positions the stopper 34f at the sunken position when the used battery 201 moves from the base portion 34e to the second transporting unit 37.

Battery Replacement Method

Figure 6:
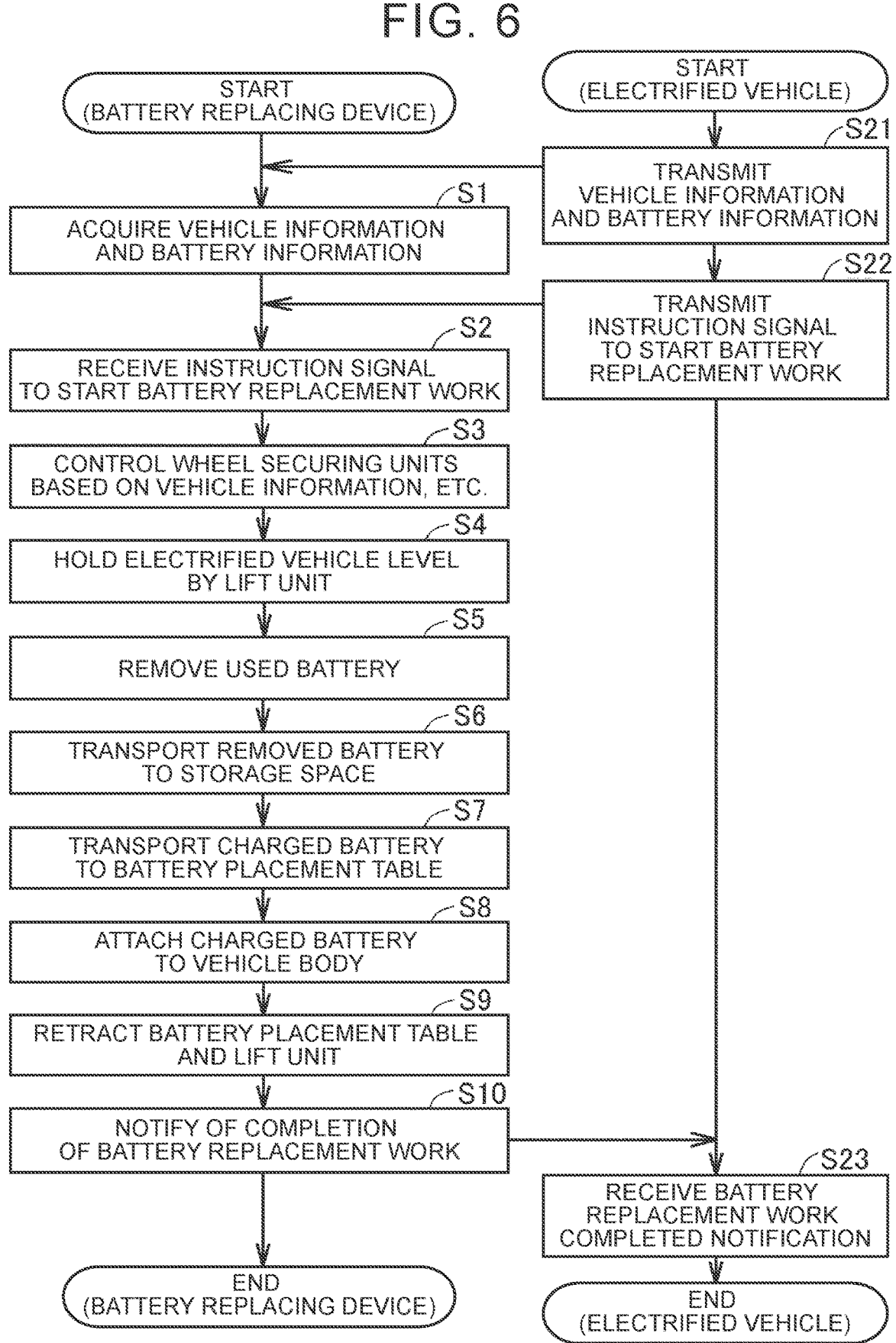
FIG. 6 is a flowchart showing each step carried out by the battery replacing device.

Next, a battery replacement method using the battery replacing device 100 will be described with reference to the flowchart (sequence diagram) of FIG. 6.

Transmission of Vehicle Information, Etc. (Performed at Electrified Vehicle Side)

First, in step S21, the electrified vehicle 200 transmits information about the electrified vehicle 200 and information about the battery 201 to the communication unit 13 of the battery replacing device 100. For example, an operation is made at an automotive navigation system (omitted from illustration) of the electrified vehicle 200, to transmit each of the above information, thereby transmitting each of the above information to the communication unit 13. The electrified vehicle 200 transmits each piece of the above information before entering the battery replacing device 100. Note that each piece of the above information may be transmitted after the electrified vehicle 200 enters the battery replacing device 100.

Acquisition of Vehicle Information, Etc. (Performed at Battery Replacing Device Side)

Next, in step S1, the communication unit 13 of the battery replacing device 100 acquires, through communication, the information regarding the electrified vehicle 200 and the information regarding the battery 201, transmitted from the electrified vehicle 200 in step S21. Each piece of the acquired information is stored in the memory 12 (see FIG. 1).

The communication unit 13 may also acquire information regarding capacity (charge capacity) of the battery 201 and the state of charge (SOC) of the battery 201.

Transmission of Instruction Signal for Battery Replacement Work (Performed at Electrified Vehicle Side)

Next, in step S22, the electrified vehicle 200 that is stopped in the vehicle stop area 103 transmits an instruction signal to the communication unit 13, to start battery replacement work.

Reception of Instruction Signal for Battery Replacement Work (Performed at Battery Replacing Device Side)

Next, in step S2, the communication unit 13 receives the instruction signal transmitted from the electrified vehicle 200 in step S22. Note that in step S2, upon receiving the instruction signal, the processor 11 may transmit an instruction message or the like to the user of electrified vehicle 200 through the communication unit 13, for turning ignition power to an off state.

Control of Wheel Securing Units (Performed at Battery Replacing Device Side)

Next, in step S3, the processor 11 adjusts the positions of the wheel securing units 31 (see FIG. 2) based on the information (vehicle information and battery information) acquired through the communication unit 13 in step S1. Note that the processor 11 may control each of the four wheel securing units 31 independently of each other.

Accordingly, the position and the orientation of the vehicle body 200a in the lateral direction are adjusted, and also the position and the orientation of the battery 201 in the lateral direction are adjusted. As a result, the battery 201 is moved to a predetermined position above the opening portion 32a.

Holding Vehicle Body Level (Performed at Battery Replacing Device Side)

Next, in step S4, the processor 11 places the shutter 32 in an open state and raises the lift unit 35 in the state in which the shutter 32 is open. Thus, after passing through the opening portion 32a, the lift unit 35 lifts the electrified vehicle 200 so that the height H of the lower face 200b of the vehicle body 200a from the floor surface FL reaches the predetermined height (see FIG. 3).

Cleansing of Fastening Members (Performed at Vehicle Side)

The cleansing unit 200d cleanses the fastening members 205 either by the time step S4 is completed, or before step S5 is started. First, the pump 200g of the supply unit 200f is driven. The spray unit 200e moves from the stored position to the spraying position under the pressure of the cleansing fluid F generated thereby, and sprays the cleansing fluid F toward the fastening members 205. Accordingly, the fastening members 205 are cleansed, so that the foreign matter adhering to the fastening members 205 or the vicinity thereof (tool insertion holes 201f and so forth) is removed. Note that cleansing of the fastening members 205 may be performed inside the battery replacing station 100a or may be performed outside of the battery replacing station 100a.

Removal of Used Battery (Performed at Battery Replacing Device Side)

Next, in step S5, the used battery 201 is removed from the vehicle body 200a of the electrified vehicle 200. First, the processor 11 raises the battery placement table 34. Thus, as illustrated in FIG. 7, the positioning pins 34a are inserted into the pin insertion holes 208 formed in the lower face 200b of the vehicle body 200a, and also the locking/unlocking tools 34b are inserted into the tool insertion holes 201f formed in the bottom face 201e of the battery 201, and the base portion 34e either abuts or approaches the bottom face 201e of the battery 201. As a result, the battery placement table 34 is positioned with respect to the electrified vehicle 200 (i.e., as to the battery 201). Note that at this time, the positioning pins 34a are inserted into the pin insertion holes 208 prior to the locking/unlocking tools 34b being inserted into the tool insertion holes 201f.

Next, the processor 11 raises the locking/unlocking tools 34b in a state in which the locking/unlocking tools 34b are inserted into the tool insertion holes 201f. The processor 11 then drives (rotates) the locking/unlocking tools 34b inserted into the tool insertion holes 201f. This unlocks the fastening members 205 in the tool insertion holes 201f. As a result, the battery 201 is removed from the vehicle body 200a, and placed on the base portion 34e. Note that the timing at which the positioning pins 34a are inserted into the pin insertion holes 208 and the timing at which the locking/unlocking tools 34b are inserted into the tool insertion holes 201f may be the same as each other.

Transporting Used Battery to Storage Space (Performed at Battery Replacing Device Side)

Next, in step S6, the battery 201 removed from the vehicle body 200a in step S5 is transported to the storage space 42 (see FIG. 1). First, the processor 11 lowers the battery placement table 34, on which the battery 201 is placed, to the height position of the second transporting unit 37 (see FIG. 1). Next, the processor 11 lowers the lift unit 35 to a position below the battery placement table 34 (e.g., the position illustrated in FIG. 1). Thus, the vehicle body 200a is no longer held by the lift unit 35, and consequently the electrified vehicle 200 is placed on the floor surface FL of the vehicle stop area 103. At this time, the processor 11 positions the stopper 34f at the sunken position. Subsequently, the processor 11 drives the roller portions 34c (see FIG. 4) of the battery placement table 34 so that the battery 201 moves over the base portion 34e, in the transporting direction (Y2 direction). Thus, the battery 201 placed on the base portion 34e moves over the base portion 34e toward the second transporting unit 37 without abutting the stopper 34f, and is relocated from the base portion 34e to the second transporting unit 37. The battery 201 is transported to the storage space 42 by the second transporting unit 37 and stored therein. This battery 201 may be charged at the charging facility 52 in the storage space 42. Note that the battery 201 is transported to the storage compartment 100b by the transporting unit, either after charging is completed or during charging.

Transporting Charged Battery to Battery Placement Table (Performed at Battery Replacing Device Side)

Next, in step S7, the processor 11 transports the charged battery 101 stored in the storage compartment 100b to the battery placement table 34. Specifically, after transporting the battery 101 from the storage compartment 100b to the temporary storage site 40 in the underfloor area 100c, the processor 11 transports the battery 101 in a transporting direction from the temporary storage site 40 to the battery placement table 34 (Y2 direction) by the first transporting unit 36. At this time, the processor 11 positions the stopper 34f at the projecting position. Upon the battery 101 being relocated from the first transporting unit 36 to the base portion 34e, the processor 11 drives the roller portions 34c so that the battery 101 moves over the base portion 34e in the transporting direction. As a result, the battery 101 abuts the stopper 34f and thus stops at the predetermined position on the base portion 34e.

Installing Charged Battery (Performed at Battery Replacing Device Side)

Next, in step S8, the processor 11 performs control to attach the battery 101 that is charged to the vehicle body 200a. Specifically, the processor 11 raises the lift unit 35 so that the height H of the lower face 200b of the vehicle body 200a from the floor surface FL of the vehicle stop area 103 reaches the predetermined height.

Subsequently, the processor 11 raises the battery placement table 34. Accordingly, the positioning pins 34a are inserted into the pin insertion holes. The processor 11 raises the locking/unlocking tools 34b in this state. Thus, the locking/unlocking tools 34b are inserted into the tool insertion holes of the battery 101. The processor 11 then drives (rotates) the locking/unlocking tools 34b. Accordingly, the bolts inside the tool insertion holes are locked. Upon detection being made that all the bolts are locked, the vehicle-side connector (omitted from illustration) and the connector (omitted from illustration) of the battery 101 are locked. As a result, attachment of the battery 101 that is charged, to the vehicle body 200a, is completed.

Retraction of Battery Placement Table and Lift Unit (Performed at Battery Replacing Device Side)

Next, in step S9, the processor 11 lowers the battery placement table 34 and the lift unit 35, and performs retraction thereof from the electrified vehicle 200. Thereafter, the processor 11 places the shutter 32 in a closed state (see FIG. 2).

Notification of Battery Replacement Work Completion (Performed at Battery Replacing Device Side)

Next, in step S10, the processor 11 notifies the electrified vehicle 200 through the communication unit 13 that the battery replacement work has been completed.

Reception of Battery Replacement Work Completion Notification (Performed at Electrified Vehicle Side)

In the following step S23, the electrified vehicle 200 receives the notification transmitted from the communication unit 13 of the battery replacing device 100 in step S10. Thus, the electrified vehicle 200 is brought into a state in which the ignition power can be turned on. Thereafter, the processing ends.

Although the above-described embodiment illustrates an example in which the position of the drive device 30 is adjusted based on information on each of the electrified vehicle 200 and the battery 201, the present disclosure is not limited to this. The position of the drive device 30 may be adjusted based on information regarding either one of the electrified vehicle 200 and the battery 201.

As described above, the electrified vehicle 200 according to the present embodiment includes the cleansing unit 200*d* for cleansing the fastening members 205, and accordingly the locking/unlocking tools 34*b* for removing the fastening members 205 can effectively fit the fastening members 205.

In the above embodiment, the cleansing unit 200*d* may be provided in the battery replacing station 100*a*. In this case, the cleansing unit 200*d* is provided on the floor surface FL of the vehicle stop area 103, the battery placement table 34, or the like.

Figure 10:
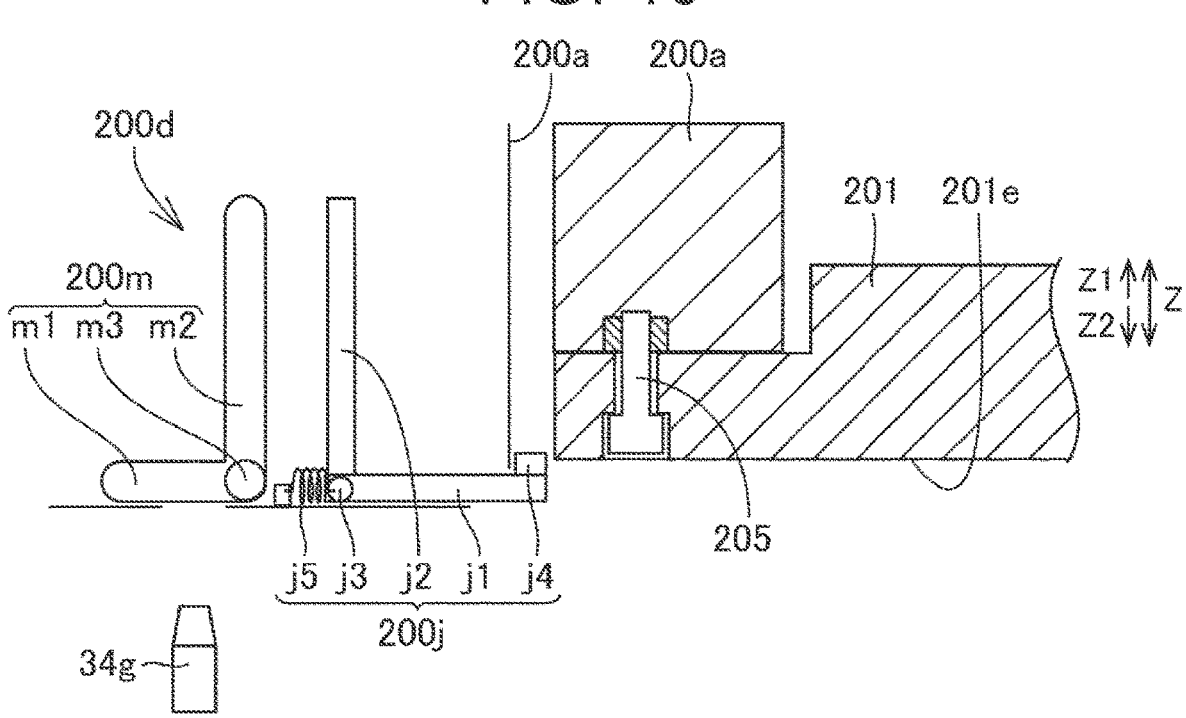
FIG. 10 is a diagram schematically illustrating a configuration of a modification of the cleansing unit.
Figure 11:
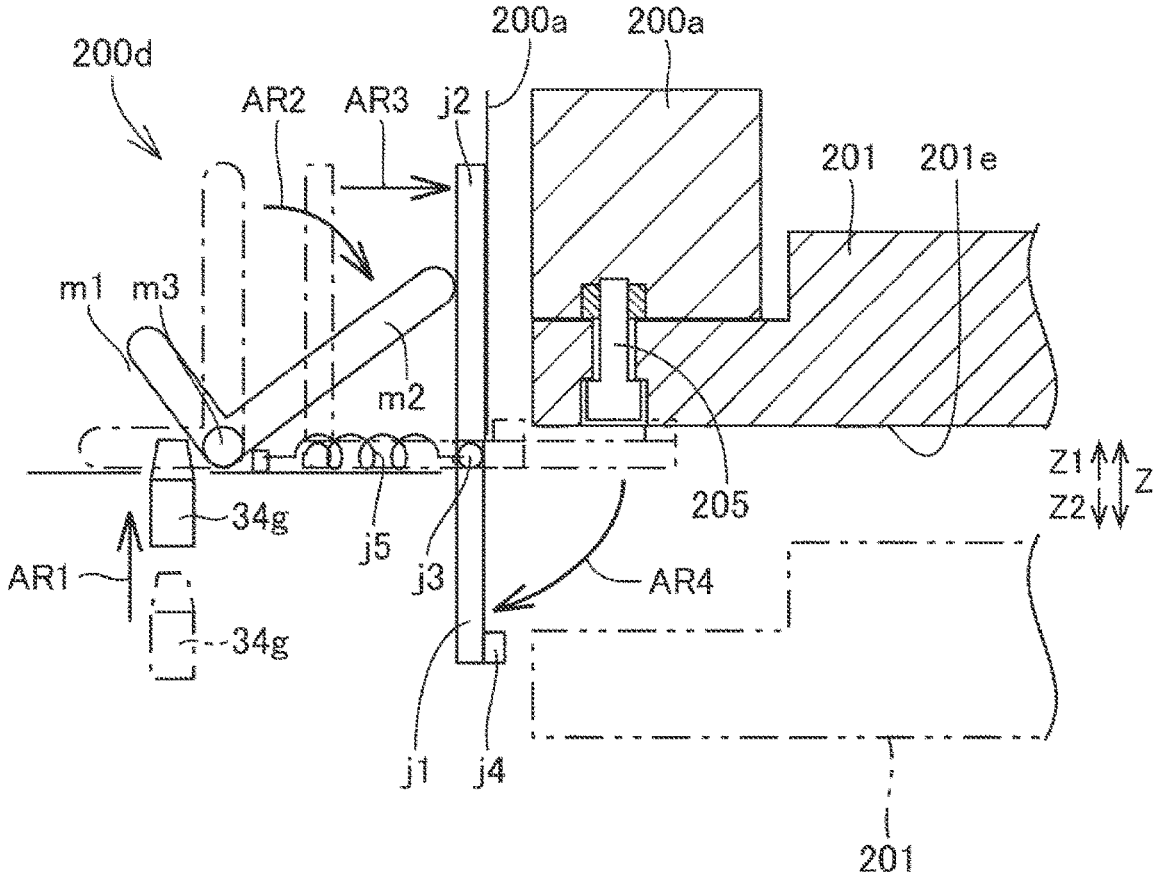
FIG. 11 is a diagram schematically illustrating the configuration of the modification of the cleansing unit.

Also, in the above embodiment, the cleansing unit 200*d* may have a slider 200*j* and a cam lever 200*m*, as illustrated in FIGS. 10 and 11.

The slider 200*j* is provided on the vehicle body 200*a*. The slider 200*j* is movable with respect to the vehicle body 200*a* in a direction toward the battery 201 (right direction in FIGS. 10 and 11) and in a direction away from the battery 201 (left direction in FIGS. 10 and 11). The slider 200*j* has a first slider portion j1, a second slider portion j2, a rotation shaft j3, a brush portion j4, and a biasing member j5.

The first slider portion j1 is disposed in the vehicle body 200*a*, with an attitude that is parallel to the lower face 200*b* of the vehicle body 200*a*.

The second slider portion j2 is disposed with an attitude that is orthogonal to the first slider portion j1.

The rotation shaft j3 links the first slider portion j1 and the second slider portion j2. More specifically, the rotation shaft j3 links a basal end portion of the first slider portion j1 and a lower end portion of the second slider portion j2, so as to enable pivoting of the first slider portion j1 about the rotation shaft j3. The vehicle body 200*a* is provided with a guide slit (omitted from illustration) that guides the rotation shaft j3 in a longitudinal direction (right-left direction in FIG. 10) of the first slider portion j1, and the rotation shaft j3 is movable along this guide slit.

The brush portion j4 is provided at a distal end portion of the first slider portion j1. The brush portion j4 can clean the fastening members 205. The brush portion j4 has a shape extending upward from the distal end portion of the first slider portion j1.

The biasing member j5 connects the vehicle body 200*a* and the rotation shaft j3, and biases the rotation shaft j3 in an orientation away from the battery with respect to the vehicle body 200*a*. Note that the biasing member j5 may be connected to the second slider portion j2.

The cam lever 200*m* drives the brush portion j4. Specifically, the cam lever 200*m* presses the slider 200*j* by being pushed by a positioning pin 34*g* provided on the base portion 34*e*. Note that the positioning pin 34*a* may make up the positioning pin 34*g*. The cam lever 200*m* has a first lever portion m1, a second lever portion m2, and a rotation shaft m3.

The first lever portion m1 is disposed in the vehicle body 200*a*, with an attitude that is parallel to the lower face 200*b* of the vehicle body 200*a*. The first lever portion m1 is a portion that is pressed by the positioning pin 34*g*.

The second lever portion m2 is orthogonal to the first lever portion m1. The second lever portion m2 can press the second slider portion j2.

The rotation shaft m3 links the first lever portion m1 and the second lever portion m2. The rotation shaft m3 links the first lever portion m1 and the second lever portion m2 such that the attitude of the second lever portion m2 with respect to the first lever portion m1 is maintained.

Cleansing of Fastening Members (Performed at Vehicle Side)

Upon the positioning pin 34*g* pressing the first lever portion m1 upward, as indicated by arrow AR1 in FIG. 11, the second lever portion m2 pivots about the rotation axis m3, as indicated by arrow AR2. Then, due to the second slider portion j2 being pushed by this second lever portion m2, the slider 200*j* moves in the direction toward the battery 201 against the biasing force of the biasing member, as indicated by arrow AR3. During this movement, the fastening member 205 is cleaned by the brush portion j4. Note that in FIG. 11, the positioning pin 34*g*, the slider 200*j*, and the cam lever 200*m*, prior to movement, are indicated by long dashed short dashed lines.

When the second slider portion j2 comes into contact with a side face of the vehicle body 200*a*, the first slider portion j1 pivots about the rotation axis j3, as indicated by arrow AR4. At this time, the first slider portion j1 pivots from the movement path of the battery 201 to a retracted position. Accordingly, a situation in which removal of the battery 201 from the vehicle body 200*a* is hindered by the first slider portion j1 and the brush portion j4 can be circumvented. Note that in FIG. 11, the first slider portion j1 and the brush portion j4, immediately prior to pivoting about the rotation axis m3, are indicated by long dashed double-short dashed lines.

Thereafter, when the positioning pin 34*g* descends together with the base portion 34*e*, the slider 200*j* moves toward the cam lever 200*m* under the biasing force of the biasing member j5. At this time, the first slider portion j1 returns to the initial attitude (the attitude indicated in FIG. 10) by pivoting about the rotation axis j3, and the cam lever 200*m* also returns to the initial attitude (the attitude illustrated in FIG. 10) by being pressed by the second slider portion j2.

It will be appreciated by those skilled in the art that the exemplary embodiment described above is a specific example of the aspects described below.

Form 1

A vehicle, comprising: a vehicle body including a mounting portion that is configured to mount a battery, the battery that is disposed in the mounting portion, a fastening member that fastens the battery to the mounting portion, and a cleansing unit that cleanses the fastening member.

This vehicle has the cleansing unit for cleansing the fastening member, and accordingly, a tool for removing the fastening member is effectively fit to the fastening member when the battery is replaced.

Form 2

The vehicle according to Form 1, wherein the cleansing unit includes a spray unit for spraying the fastening member with a cleansing fluid for cleansing the fastening member, and a supply unit for supplying the cleansing fluid to the spray unit.

Form 3

The vehicle according to Form 2, wherein the spray unit is configured to move in an up-down direction, between a spraying position for spraying the cleansing fluid toward the fastening member from below, and a stored position of being stored in the vehicle body.

In this Form, adhesion of foreign matter to the spray unit is suppressed by positioning the spray unit at the stored position when the cleansing fluid is not being sprayed by the spray unit.

Form 4

The vehicle according to Form 3, wherein the supply unit includes a pump for feeding the cleansing fluid towards the spray unit, and wherein the spray unit moves from the stored position to the spraying position under pressure of the cleansing fluid generated by driving the pump.

In this Form, no dedicated member for moving the spray unit is required, and accordingly the configuration of the cleansing unit is simplified.

Form 5

The vehicle according to Form 1, wherein the cleansing unit includes a brush portion configured to clean the fastening member, and a cam lever for driving the brush portion, and wherein the cam lever drives the brush portion by being pressed when the battery is replaced.

In this Form, the fastening member is cleaned by the brush portion when the battery is replaced, and accordingly the tool for removing the fastening member is effectively fitted to the fastening member.

Form 6

The vehicle according to Form 5, wherein the brush portion moves to a position retracted from a movement path of the battery, following cleaning of the fastening member.

In this aspect, when the battery is removed after cleaning the fastening member, interference of the brush portion with the battery is circumvented.

The embodiment disclosed herein should be considered to be exemplary and not restrictive in all respects. The scope of the disclosure is set forth in the claims, rather than in the above description of the embodiments, and further is intended to include all modifications within the meaning and the scope equivalent to the claims.

What is claimed is:

1. A vehicle comprising:
a battery;
a vehicle body including a mounting portion that is configured to mount the battery;
a fastening member for fastening the battery to the mounting portion; and
a cleansing unit for cleansing the fastening member, the cleansing unit including
a spray unit for spraying the fastening member with a cleansing fluid for cleansing the fastening member, and
a supply unit for supplying the cleansing fluid to the spray unit,
wherein,
the spray unit is configured to move in an up-down direction, between a spraying position for spraying the cleansing fluid toward the fastening member from below, and a stored position in the vehicle body,
the supply unit includes a pump for feeding the cleansing fluid towards the spray unit, and
the spray unit moves from the stored position to the spraying position under pressure of the cleansing fluid generated by driving the pump.

2. The vehicle according to claim 1, wherein the cleansing fluid for cleansing is air or a washing liquid.

3. A vehicle comprising:
a battery;
a vehicle body including a mounting portion that is configured to mount the battery;
a fastening member for fastening the battery to the mounting portion; and
a cleansing unit for cleansing the fastening member
wherein the cleansing unit includes a brush portion configured to clean the fastening member, and a cam lever for driving the brush portion, and
wherein the cam lever drives the brush portion by being pressed when the battery is replaced.

4. The vehicle according to claim 3, wherein the brush portion moves to a position retracted from a movement path of the battery, following cleaning of the fastening member.

* * * * *